(12) United States Patent
Henriques, Jr. et al.

(10) Patent No.: US 9,243,710 B2
(45) Date of Patent: Jan. 26, 2016

(54) FLEXIBLE CONNECTION ROD

(71) Applicant: Barnes Group Inc., Bristol, CT (US)

(72) Inventors: Fernando Henriques, Jr., Sao Paulo (BR); Ricardo Paschoaneli, Sao Paulo (BR); Jose Ubaldino Rosa, Sao Paulo (BR)

(73) Assignee: Barnes Group Inc., Bristol, CT (US)

( * ) Notice: Subject to any disclaimer, the term of this patent is extended or adjusted under 35 U.S.C. 154(b) by 60 days.

(21) Appl. No.: 13/957,043

(22) Filed: Aug. 1, 2013

(65) Prior Publication Data

US 2014/0041620 A1    Feb. 13, 2014

Related U.S. Application Data

(60) Provisional application No. 61/681,711, filed on Aug. 10, 2012.

(51) Int. Cl.
| | |
|---|---|
| *F02B 75/32* | (2006.01) |
| *B23P 11/00* | (2006.01) |
| *F16J 1/10* | (2006.01) |
| *F16J 7/00* | (2006.01) |
| *F16C 7/02* | (2006.01) |

(52) U.S. Cl.
CPC .... *F16J 1/10* (2013.01); *F16J 7/00* (2013.01); *F16C 7/023* (2013.01); *Y10T 29/49288* (2015.01)

(58) Field of Classification Search
CPC ........... F16C 7/023; F16C 9/04; F02B 75/32; F02B 41/04; F02B 2075/025; B23P 15/10; B23P 15/00; B23P 2700/11
USPC ......... 123/197.3, 197.1, 198 P, 51 BB, 197.4; 29/888.051, 888.09, 260; 92/230, 238, 92/258

See application file for complete search history.

(56) References Cited

U.S. PATENT DOCUMENTS

| | | | |
|---|---|---|---|
| 1,301,441 A * | 4/1919 | Kerlin | 123/68 |
| 2,327,645 A * | 8/1943 | Hughes | 123/47 R |
| 2,382,280 A | 8/1945 | Allison | |
| 5,673,666 A | 10/1997 | Beardmore et al. | |
| 6,223,703 B1 | 5/2001 | Galvin | |
| 6,467,373 B1 * | 10/2002 | El Tahry et al. | 74/579 E |
| 7,318,397 B2 * | 1/2008 | Ward | 123/48 R |

OTHER PUBLICATIONS

U.S. Searching Authority, International Search Report and Written Opinion, issued Oct. 16, 2013, for related application No. PCT/US2013/053225.

* cited by examiner

*Primary Examiner* — Lindsay Low
*Assistant Examiner* — Syed O Hasan
(74) *Attorney, Agent, or Firm* — Fay Sharpe LLP

(57) ABSTRACT

A flexible connecting rod arrangement for engines, hermetic compressors, and any application that requires a connection between a piston and a crankcase or any application that requires a connection between a linear slider and a crankcase.

16 Claims, 4 Drawing Sheets

FLEXIBLE CONNECTION ROD

The present invention claims priority on U.S. Provisional Patent Application Ser. No. 61/681,711 filed Aug. 10, 2012, which is incorporated herein.

The present invention is directed to connection rods and more particularly to a flexible connection rod.

BACKGROUND OF THE INVENTION

The rod that is used between piston and a crankcase for a variety of different devices is a rigid connection rod. The rigidity of the connection rod can cause increased rates of wear in the crank bearing and piston of the compressor or any other reciprocating device.

SUMMARY OF THE PRESENT INVENTION

The present invention is an improvement over past connection rod configurations so as to address the problems of past connection rods. The present invention is directed to a flexible connection rod for engines, hermetic compressors, and any application that requires a connection between a piston and a crankcase or an application that requires a connection between a linear slider and a crankcase. The flexible portion of the connection rod can be formed by one or more springs; however, this is not required. The one or more springs, when used on the connection rod, form a flexible connection rod that can be used to connect the crank and the piston. The connection rod can be completely formed or partially formed of a flexible material (e.g., spring, piston, other elements, etc.). When the connection rod includes a spring, the spring force of the spring may be constant or varied along the longitudinal length of the spring. The wire diameter of the spring may be constant or varied along the longitudinal length of the spring. The diameter of the spring may be constant or varied along the longitudinal length of the spring. The material used to form the spring may be constant or varied along the longitudinal length of the spring. The flexible portion of the connection rod can include a single spring or two or more nested springs. If two or more nested springs are used, a) the direction of the windings of the springs may be the same or different, b) the free length of the springs may be the same or different, c) the wire diameter of the springs may be the same or different, d) the diameter of the springs may be the same or different, e) the spring force of the springs may be the same or different, and/or f) the material used to form the springs may be the same or different.

One non-limiting purpose of the present invention is to reduce wear in the crank bearing and piston of the compressor or any linear sliding mechanism. This is accomplished by the present invention by reducing the axial stresses in the piston and connection rod by use of a flexible connection rod. The flexible connection rod is an elastic element that can absorb axial deflections, so that such axial deflections are distributed over a larger share of the crank bearing and piston surface. Also, the shape of the flexible connection rod can be adapted for each size and type of compressor, engine, device or linear slide device so that the connection introduces an additional degree of freedom, which can distribute stresses over a larger bearing and piston surface. Such a configuration of the flexible connection rod can reduce the wear on the crank bearing and piston of the compressor and increase the life of the crank bearing and/or piston.

In one non-limiting aspect of the present invention, there is provided a connection rod configuration that includes a piston, a flexible connection rod and a bearing. The piston is designed to reciprocate in a piston cavity of a cylinder. The size, shape, and materials of the piston, flexible connection rod and bearing are non-limiting. Generally, the piston is shaped and sized to properly move in the piston cavity of the cylinder. The piston includes a rod cavity that is designed to telescopically receive a first end portion of the flexible connection rod. The rod cavity also includes a connector that is designed to enable the first end of the flexible connection rod to connect to the interior of the rod cavity. The type of connector used is non-limiting. In one non-limiting arrangement, the connector is a pivot connection that enables the first end of the flexible connection rod to pivot in the interior of the rod cavity as the piston reciprocates in the piston cavity of the cylinder. As can be appreciated, other connection arrangements can be used. The bearing is generally designed to be connected to a crankshaft or other type of rotating mechanism.

In another non-limiting aspect of the present invention, the cross-sectional area of the bottom opening of the rod cavity in the piston is greater than the cross-sectional area of the section of the flexible connection rod that is located at or near the opening of the rod cavity in the piston when the first end of the flexible connection rod connects to the interior of the rod cavity. Such size difference in the sizes of the cross-sectional areas of flexible connection rod and the opening of the rod cavity in the piston enables the front portion of the flexible connection rod to move within the rod cavity in the piston as the piston reciprocates in the piston cavity of the cylinder. In one non-limiting configuration the size ratio of the cross-sectional area of the flexible connection rod that is located at or near the opening of the rod cavity in the piston to the cross-sectional area of the opening of the rod cavity in the piston is about 0.1-0.95:1, typically about 0.15-0.9:1, more typically about 0.2-0.8:1, and more typically about 0.25-0.5:1.

In still another non-limiting aspect of the present invention, the depth of the rod cavity in the piston is such that the total length of the flexible connection rod is not contained in the rod cavity when the first end of the flexible connection rod connects to the interior of the rod cavity. Generally, the ratio of the longitudinal length of the flexible connection rod to the longitudinal length of the rod cavity is at least about 1.1:1, and typically at least about 1.5:1. In one non-limiting specific arrangement, the ratio of the longitudinal length of the flexible connection rod to the longitudinal length of the rod cavity is about 1.2-100:1, typically 1.3-50:1. As can be appreciated, other length ratios can be used.

In still another non-limiting aspect of the present invention, the flexible connection rod is in the form of a spring. Generally, at least about 25% of the length of the flexible connection rod is a spring, typically at least about 33% of the length of the flexible connection rod is a spring, more typically at least about 40% of the length of the flexible connection rod is a spring, still more typically at least about 50% of the length of the flexible connection rod is a spring, yet more typically at least about 75% of the length of the flexible connection rod is a spring, and still yet more typically 100% of the length of the flexible connection rod is a spring.

In yet another non-limiting aspect of the present invention, the second end of the flexible connection rod is connected to the bearing by a pivot connection that enables the second end of the flexible connection rod to pivot on the bearing when the piston reciprocates in the piston cavity of the cylinder. As can be appreciated, other connection arrangements can be used.

In still yet another non-limiting aspect of the present invention, the flexible connection rod includes a cylinder connector that is located at one or both ends of the flexible connection rod. The cylinder connector includes a cavity that includes a circular cross-sectional area that is designed to receive a connection pin. The connection pin can be located on one or both of the bearing and the rod cavity. The connection pin and cylinder connector connection arrangement can be used to facilitate in the formation of the pivoting connection between 1) the first end of the flexible connection rod and the rod cavity and/or 2) the second end of the flexible connection rod and the bearing. As can be appreciated, the reverse arrangement on one or both ends of the flexible connection rod can exist (e.g., one or both ends of the flexible connection rod includes the connection pin, and the rod cavity and/or the bearing includes the cylinder connector). As can be appreciated, other or alternative arrangement can be used to create the pivoting connection between the flexible connection rod and the rod cavity and/or the bearing.

In another non-limiting aspect of the present invention, the bearing includes a mounting seat that is designed to facilitate in the connection of the flexible connection rod to the bearing. In one non-limiting configuration, the mounting seat is designed to be inserted into the second end of the flexible connection rod. In still another non-limiting configuration, the mounting seat is designed to telescopically receive a portion of the second end of the flexible connection rod. In one non-limiting configuration, the mounting seat includes a pin slot that is designed to receive a connection pin that is used to connect the flexible connection rod to the bearing; however, this is not required. In another non-limiting configuration, when the mounting seat is designed to be inserted into the second end of the flexible connection rod, the second end of the flexible connection rod includes a connection cavity that is designed to receive the mounting seat and the ratio of the cross-sectional area of the connection cavity to the cross-sectional area of the mounting seat is about 0.9-2:1, typically 0.9-1.5:1, more typically about 0.9-1.1:1, and still more typically about 0.95-1.05:1. In this arrangement, generally the cross-sectional shape of the mounting seat is the same as the cross-sectional shape of the connection cavity; however, this is not required. Also, in this arrangement, the connection between the flexible connection rod and the bearing is typically not a pivoting connection. The mounting seat is designed to be inserted into less than the full longitudinal length of the flexible connection rod. Generally, the mounting seat is designed to be inserted into less than 90% of the full longitudinal length of the flexible connection rod, typically less than about 75% of the full longitudinal length of the flexible connection rod, more typically less than about 65% of the full longitudinal length of the flexible connection rod, still more typically less than about 50% of the full longitudinal length of the flexible connection rod, still even more typically less than about 40% of the full longitudinal length of the flexible connection rod, and yet still even more typically less than about 25% of the full longitudinal length of the flexible connection rod.

In still another non-limiting aspect of the present invention, the rod cavity includes a connection slot in the top of the rod cavity that is designed to include the connector which in turn is designed to receive a portion of the flexible connection rod that is to be connected to the rod cavity; however, this is not required. The connector slot can include a pin slot that is designed to receive a connection pin that is used to connect the flexible connection rod to the rod cavity; however, this is not required.

One non-limiting object of the present invention is to provide a connection rod configuration that reduces wear in the crank bearing and piston of the compressor or any linear sliding mechanism.

Another and/or alternative non-limiting object of the present invention is to provide a connection rod configuration that reduces the axial stresses in the piston and connection rod by use of a flexible connection rod.

Still another and/or alternative non-limiting object of the present invention is to provide a connection rod configuration that includes a flexible connection rod that is an elastic element that can absorb axial deflections, so that such axial deflections are distributed over a larger share of the crank bearing and piston surface.

Yet another and/or alternative non-limiting object of the present invention is to provide a connection rod configuration that includes a flexible connection rod that can be adapted for each size and type of compressor, engine, device or linear slide devices so that the connection introduces an additional degree of freedom, which can cause distributed stresses over a larger bearing and piston surface.

Still yet another and/or alternative non-limiting object of the present invention is to provide a connection rod configuration that can reduce the wear on the crank bearing and piston of the compressor and increase the life of the crank bearing and/or piston.

Another and/or alternative non-limiting object of the present invention is to provide a connection rod configuration that forms a flexible connection rod for engines, hermetic compressors, and any application that requires a connection between a piston and a crankcase or an application that requires a connection between a linear slider and a crankcase.

Still another and/or alternative non-limiting object of the present invention is to provide a connection rod configuration that includes a flexible portion of the connection rod that can be formed by one or more springs.

Another and/or alternative non-limiting object of the present invention is to provide a connection rod configuration wherein the flexible connection rod can be completely formed or partially formed of a flexible material Still another and/or alternative non-limiting object of the present invention is to provide a connection rod configuration that includes a piston, a flexible connection rod and a bearing.

Yet another and/or alternative non-limiting object of the present invention is to provide a connection rod configuration wherein the piston includes a rod cavity that is designed to telescopically receive a first end portion of the flexible connection rod.

Still yet another and/or alternative non-limiting object of the present invention is to provide a connection rod configuration wherein the rod cavity includes a connector that is designed to enable the first end of the flexible connection rod to connect to the interior of the rod cavity.

Another and/or alternative non-limiting object of the present invention is to provide a connection rod configuration wherein the connector in the rod cavity is a pivot connection that enables the first end of the flexible connection rod to pivot in the interior of the rod cavity as the piston reciprocates in the piston cavity of the cylinder.

Still another and/or alternative non-limiting object of the present invention is to provide a connection rod configuration wherein the cross-sectional area of the bottom opening of the rod cavity in the piston is greater than the cross-sectional area of the section of the flexible connection rod that is located at or near the opening of the rod cavity in the piston when the first end of the flexible connection rod connects to the interior of the rod cavity.

Yet another and/or alternative non-limiting object of the present invention is to provide a connection rod configuration wherein the depth of the rod cavity in the piston is such that the total length of the flexible connection rod is not contained in the rod cavity when the first end of the flexible connection rod connects to the interior of the rod cavity.

Still another and/or alternative non-limiting object of the present invention is to provide a connection rod configuration wherein the second end of the flexible connection rod is connected to the bearing by a pivot connection that enables the second end of the flexible connection rod to pivot on the bearing when the piston reciprocates in the piston cavity of the cylinder.

Yet another and/or alternative non-limiting object of the present invention is to provide a connection rod configuration wherein the flexible connection rod includes a cylinder connector that is located at one or both ends of the flexible connection rod.

Still yet another and/or alternative non-limiting object of the present invention is to provide a connection rod configuration wherein the bearing includes a mounting seat that is designed to facilitate in the connection of the flexible connection rod to the bearing.

Another and/or alternative non-limiting object of the present invention is to provide a connection rod configuration wherein the rod cavity includes a connection slot in the top of the rod cavity that is designed to receive a portion of the flexible connection rod that is to be connected to rod cavity.

Still another and/or alternative non-limiting object of the present invention is to protect the entire system when for some reason the system is blocked.

Still another and/or alternative non-limiting object of the present invention is to reduce cost of the machining process since the perfect alignment in between the piston and the motor block is not required when a flexible connecting rod is utilized.

These and other objects and advantages will become apparent to those skilled in the art upon the reading and following of this description taken together with the accompanying drawings.

BRIEF DESCRIPTION OF THE DRAWINGS

Reference may now be made to the drawings, which illustrates non-limiting embodiments of the present invention.

DESCRIPTION OF NON-LIMITING EMBODIMENT

Figure 1:
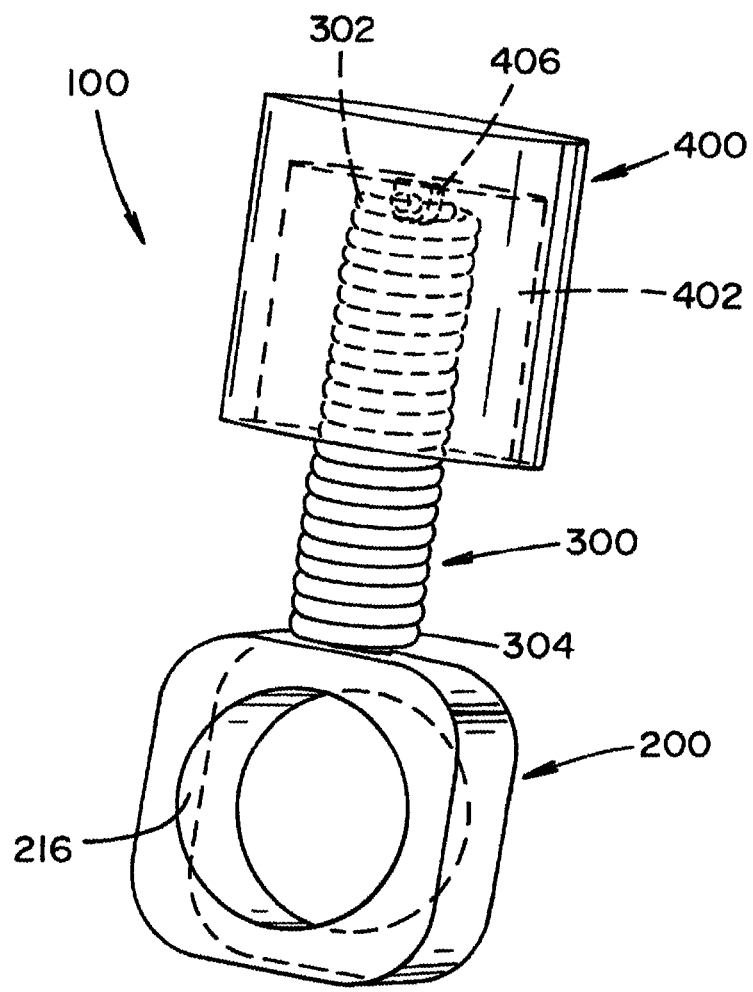
FIG. 1 is a front elevation view of one non-limiting connection rod configuration in accordance with the present invention.
Figure 2:
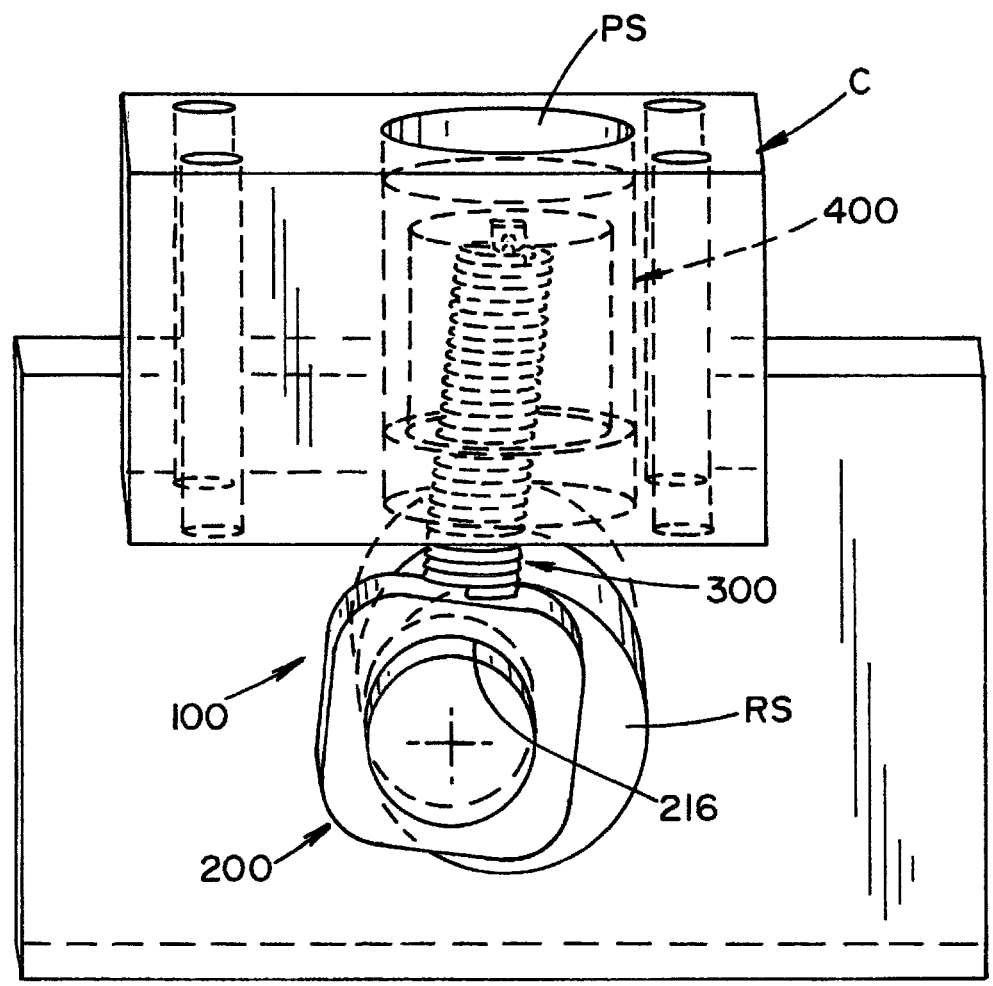
FIG. 2 is a front elevation view of the connection rod configuration of FIG. 1 that is connected between a rotatable shaft and a cylinder.

Referring now to FIGS. 1-5, which illustrate a non-limiting embodiment of the present invention, there is provided a connection rod configuration 100 that includes a bearing 200, a flexible connection rod 300, and a piston 400. As illustrated in FIG. 2, the connection rod configuration 100 is designed to form a flexible connection between a rotatable shaft RS and a cylinder C. The cylinder can be any type of cylinder such as, but not limited to, a combustion cylinder. One non-limiting type of combustion cylinder could be a combustion cylinder that is part of combustion engine. The cylinder C includes a piston chamber PS that is designed to allow the piston 400 to reciprocate in the piston chamber as illustrated by the dashed lines in FIG. 2. The piston chamber is illustrated as having a generally circular cross-sectional shape; however, this is not required. Likewise, the piston is illustrated has having a generally circular cross-sectional shape; however, this is not required. The reciprocation of the piston in the cylinder results in the rotating shaft RS being rotated. The rotation of the rotating shaft such as, but not limited to a crankshaft, can be used to drive the wheels of a vehicle, drive the operation of machinery, etc. As such, the connection rod configuration 100 of the present invention is directed to a flexible connection rod for engines, hermetic compressors, and any application that requires a connection between a piston and a crankcase or an application that requires a connection between a linear slider and a crankcase.

Figure 4:
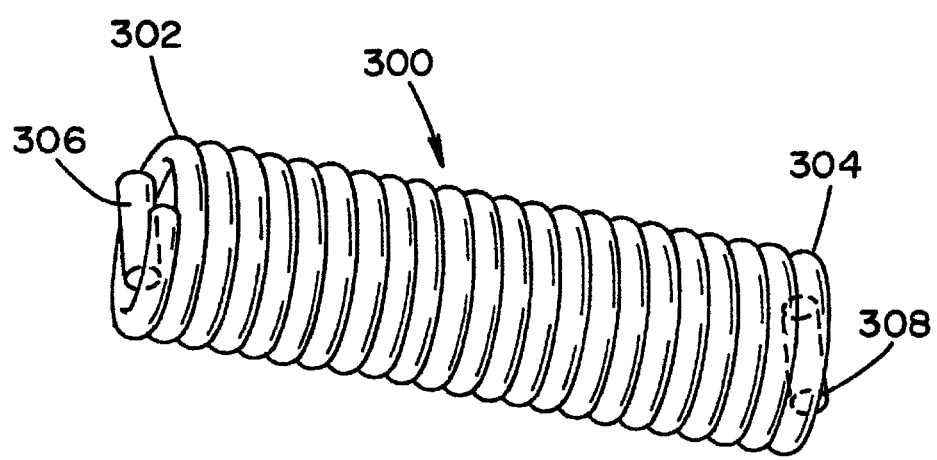
FIG. 4 is a front elevation view of the flexible connection rod of the connection rod configuration of FIG. 1; and, FIG. 5 is a front elevation view of the bearing of the connection rod configuration of FIG. 1.

The flexible connection rod 300 is generally in the form of a spring, as illustrated in FIGS. 1, 2 and 4. The spring forms a flexible connection between the bearing 100 and the piston 400. As illustrated in FIGS. 1, 2 and 4, the flexible connection rod is completely formed of a spring. Generally, the spring force of the spring is constant along the longitudinal length of the spring; however, this is not required. The wire diameter of the spring is generally constant along the longitudinal length of the spring; however, this is not required. The diameter of the spring is generally constant along the longitudinal length of the spring; however, this is not required. The flexible connection rod is used to reduce the axial stresses in the piston and connection rod. The flexible connection rod is designed to absorb axial deflections, so that such axial deflections are distributed over a larger share of the crank bearing and piston surface. The flexible connection rod can be adapted for each size and type of compressor, engine, device or linear slide device so that the connection introduces an additional degree of freedom, which can distribute stresses over a larger bearing and piston surface. The flexible connection rod can reduce the wear on the crank bearing and piston of the compressor and increase the life of the crank bearing and/or piston.

Figure 3:
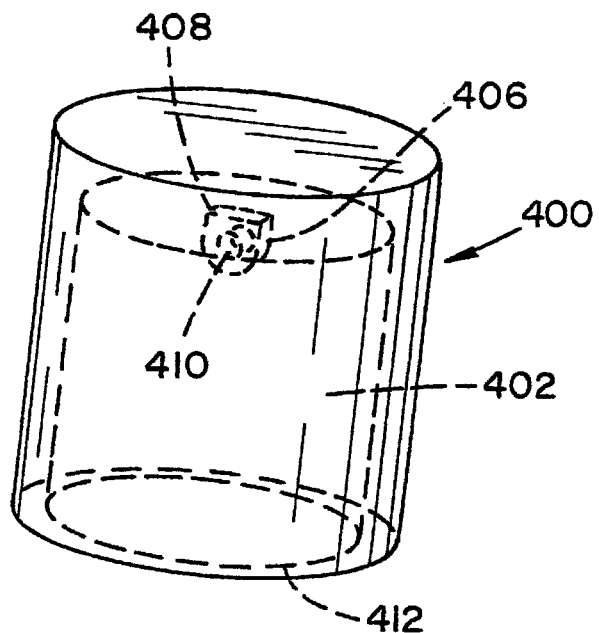
FIG. 3 is a front elevation view of the piston of the connection rod configuration of FIG. 1.

Referring now to FIGS. 1-3, the piston 400 includes a rod cavity 402 that is designed to telescopically receive a first end portion of the flexible connection rod 300. The rod cavity 402 includes a connector 406 that is designed to enable the first end portion 302 of the flexible connection rod to connect to the interior of the rod cavity 402. The connector is illustrated as forming a pivot connection that enables the first end of the flexible connection rod to pivot in the interior of the rod cavity as the piston reciprocates in the piston cavity of the cylinder. The connector 406 includes a connection slot 408 in the top of the rod cavity that includes the connector 406. The connector includes a pin slot 410 that is designed to receive a connection pin that is used to connect the flexible connection rod to the rod cavity. The connection pin is designed to be fitted through the pin slot 410 and into a cylinder connector 306 that is located at the first end portion 302 of the flexible connection rod. The cylinder connector includes a cavity that is designed to receive the connection pin. The connection pin and cylinder connector connection arrangement is used to facilitate in the formation of the pivoting connection between the first end of the flexible connection rod and the rod cavity.

Referring now to FIG. 1, the cross-sectional area of the bottom opening 412 of the rod cavity 402 in the piston 400 is greater than the cross-sectional area of the section of the flexible connection rod 300 that is located at or near the opening of the rod cavity in the piston when the first end of the flexible connection rod connects to the interior of the rod cavity. Such a difference in the sizes of the cross-sectional areas of flexible connection rod and the opening of the rod cavity in the piston enables the front portion of the flexible connection rod to move within the rod cavity in the piston as the piston reciprocates in the piston cavity of the cylinder. Generally, the size ratio of the cross-sectional area of flexible connection rod that is located at or near the opening of the rod cavity in the piston to the cross-sectional area of the opening of the rod cavity in the piston is about 0.2-0.5:1.

As illustrated in FIGS. 1 and 2, the depth of the rod cavity in the piston is such that the total length of the flexible connection rod is not contained in the rod cavity when the first end of the flexible connection rod connects to the interior of the rod cavity. Generally, the ratio of the longitudinal length of the flexible connection rod to the longitudinal length of the rod cavity is about 1.3-10:1.

Figure 5:
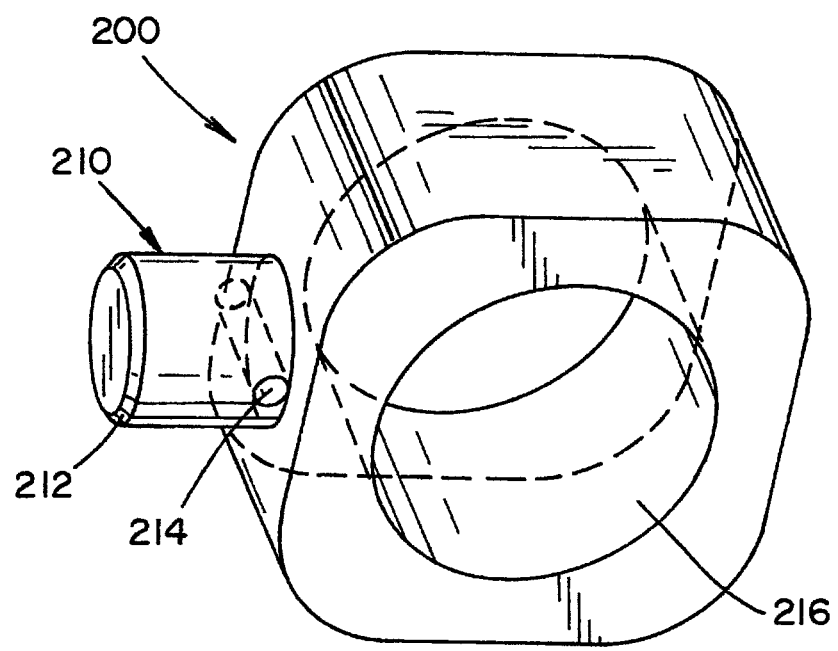

The second end 304 of the flexible connection rod 300 is connected to the bearing 200. As illustrated in FIG. 5, the bearing 200 includes a mounting seat 210 that is designed to facilitate in the connection of the flexible connection rod to the bearing. The mounting seat 210 is designed to be inserted into the second end portion 304 of the flexible connection rod as illustrated in FIGS. 1 and 2. The top portion of the mounting seat 210 can optionally include a tapered region 212 that can be used to facilitate in the insertion of the second end portion 304 of the flexible connection rod onto the mounting seat. The mounting seat is designed to be inserted into less than the full longitudinal length of the flexible connection rod. Generally, the mounting seat is designed to be inserted into less than 50% of the full longitudinal length of the flexible connection rod.

The mounting seat includes a pin slot 214 that is designed to receive a connection pin that is used to connect the second end portion of the flexible connection rod to the bearing. The pin slot 214 is designed to receive a connection pin that is used to connect the flexible connection rod to the bearing. The connection pin is designed to be fitted through the pin slot 214 and into a cylinder connector 308 that is located at the second end portion 304 of the flexible connection rod.

The bearing includes a shaft opening 216 that is designed to receive a portion of rotating shaft RS. The means to which the bearing is connected to rotating shaft RS is non-limiting. The size and shape of shafting opening 216 is generally selected to enable the bearing to rotate on the rotation shaft as the rotating shaft rotates.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

We claim:

1. A connection rod configuration comprising a bearing, a flexible connection rod, and a piston, said flexible connection rod having a first and second end portion, said first end portion connected to said piston, said second end portion connected to said bearing, said first end portion pivotally connected to said piston, said connection rod being flexible about its longitudinal axis to absorb axial deflections, said connection rod including a coil spring extending entirely between said piston and said bearing, said piston includes a rod cavity, said rod cavity telescopically receiving at least a portion of said first end portion of said flexible connection rod when said flexible connection rod is connected to said piston.

2. The connection rod configuration as defined in claim 1, wherein said piston includes a connection arrangement position at the top of said rod cavity, said connection arrangement includes a rod slot that is designed to receive a connection pin, said first end portion of said flexible connection rod includes a cylinder connector that is designed to receive said connection pin so as to pivotally connect said first end portion of said flexible connection rod to said piston.

3. The connection rod configuration as defined in claim 1, wherein a cross-sectional area of a bottom opening of said rod cavity in said piston is greater than a cross-sectional area of a section of said flexible connection rod that is located at or near said bottom opening when said first end of said flexible connection rod is connected to said piston.

4. The connection rod configuration as defined in claim 1, wherein a depth of said rod cavity in said piston is less than a total longitudinal length of said flexible connection rod.

5. The connection rod configuration as defined in claim 1, wherein said bearing includes a mounting seat that is designed to facilitate in the connection of said flexible connection rod to said bearing, said mounting seat designed to be inserted into said second end of the flexible connection rod, said mounting seat inserted into less than a full longitudinal length of said flexible connection rod.

6. The connection rod configuration as defined in claim 5, wherein said mounting seat includes a pin slot that is designed to receive a connection pin that is used to connect said second end portion of said flexible connection rod to said bearing, said second end portion of said flexible connection rod includes a cylinder connector that is designed to receive said connection pin.

7. A method of using a flexible connection rod arrangement to form a flexible connection between a rotatable shaft and a cylinder comprising the steps of:
   a. providing a connection rod configuration, said connection rod configuration comprising a bearing, a flexible connection rod flexible about its longitudinal axis to absorb axial deflections, and a piston, said flexible connection rod having a first and second end portion, said first end portion connected to said piston, said second end portion connected to said bearing, said first end portion pivotally connected to said piston, said connection rod including a coil spring extending entirely between the piston and the bearing, said piston includes a rod cavity, said rod cavity telescopically receiving at least a portion of said first end portion of said flexible connection rod when said flexible connection rod is connected to said piston;
   b. inserting said piston into a piston chamber of said cylinder, said cylinder forming a portion of an engine, said piston designed to reciprocate in said piston chamber of said cylinder; and,
   c. connecting said bearing to said rotatable shaft.

8. The method as defined in claim 7, wherein said piston includes a connection arrangement position at the top of said rod cavity, said connection arrangement includes a rod slot that is designed to receive a connection pin, said first end portion of said flexible connection rod includes a cylinder connector that is designed to receive said connection pin so as to pivotally connect said first end portion of said flexible connection rod to said piston.

9. The method as defined in claim 7, wherein a cross-sectional area of a bottom opening of said rod cavity in said piston is greater than a cross-sectional area of a section of said flexible connection rod that is located at or near said bottom opening when said first end of said flexible connection rod is connected to said piston.

10. The method as defined in claim 7, wherein a depth of said rod cavity in said piston is less than a total longitudinal length of said flexible connection rod.

11. The method as defined in claim 7, wherein said bearing includes a mounting seat that is designed to facilitate in the connection of said flexible connection rod to said bearing, said mounting seat designed to be inserted into a the second end of the flexible connection rod, said mounting seat inserted into less than a full longitudinal length of said flexible connection rod.

12. The method as defined in claim 11, wherein said mounting seat includes a pin slot that is designed to receive a connection pin that is used to connect said second end portion of said flexible connection rod to said bearing, said second end portion of said flexible connection rod includes a cylinder connector that is designed to receive said connection pin.

13. A connection rod configuration comprising a bearing, a flexible connection rod, and a piston, said flexible connection rod having a first and second end portion, said first end portion connected to said piston, said second end portion connected to said bearing, said first end portion pivotally connected to said piston, said connection rod being flexible about its longitudinal axis to absorb axial deflections, said flexible connection rod is a coil spring extending entirely between said piston and said bearing, said piston includes a rod cavity, said rod cavity telescopically receiving at least a portion of said first end portion of said flexible connection rod when said flexible connection rod is connected to said piston.

14. The connection rod configuration as defined in claim 13, wherein said piston includes a connection arrangement position at the top of said rod cavity, said connection arrangement includes a rod slot that is designed to receive a connection pin, said first end portion of said flexible connection rod includes a cylinder connector that is designed to receive said connection pin so as to pivotally connect said first end portion of said flexible connection rod to said piston, a cross-sectional area of a bottom opening of said rod cavity in said piston is greater than a cross-sectional area of a section of said flexible connection rod that is located at or near said bottom opening when said first end of said flexible connection rod is connected to said piston, a depth of said rod cavity in said piston is less than a total longitudinal length of said flexible connection rod.

15. The connection rod configuration as defined ill claim 13, wherein said bearing includes a mounting seat that is designed to facilitate in the connection of said flexible connection rod to said bearing, said mounting seat designed to be inserted into said second end of the flexible connection rod, said mounting seat inserted into less than a full longitudinal length of said flexible connection rod, said mounting seat includes a pin slot that is designed to receive a connection pin that is used to connect said second end portion of said flexible connection rod to said bearing, said second end portion of said flexible connection rod includes a cylinder connector that is designed to receive said connection pin.

16. The connection rod configuration as defined in claim 14, wherein said bearing includes a mounting seat that is designed to facilitate in the connection of said flexible connection rod to said bearing, said mounting seat designed to be inserted into said second end of the flexible connection rod, said mounting seat inserted into less than a full longitudinal length of said flexible connection rod, said mounting seat includes a pin slot that is designed to receive a connection pin that is used to connect said second end portion of said flexible connection rod to said bearing, said second end portion of said flexible connection rod includes a cylinder connector that is designed to receive said connection pin.

\* \* \* \* \*